Patented Sept. 29, 1953

2,653,934

UNITED STATES PATENT OFFICE 2,653,934

ETHYLENIMINO-S-TRIAZINES

Donald W. Kaiser, Old Greenwich, and Frederic C. Schaefer, Stamford, Conn., assignors to American Cyanamid Company, New York, N. Y., a corporation of Maine No Drawing. Application June 2, 1950,
Serial No. 165,861

6 Claims. (Cl. 260—249.6)

The present invention relates to mono- and bis-ethylenimino-s-triazines of the general formula:

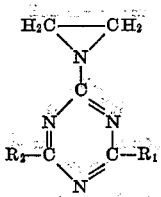

in which $R_1$ is a member of the group consisting of hydrogen, halogen, aliphatic, aromatic, amino, and alkylamino; and $R_2$ is a member of the group consisting of $R_1$ and ethylenimino.

Compounds of the above class are useful in pharmaceutical preparations, resins, and in textile treatment.

The compounds of the present invention can be made by reacting ethylenimine with the corresponding s-triazinyl halide. The reaction is a general one and can be carried out in aqueous solution with an inorganic alkaline acid acceptor such as sodium hydroxide or the like. An alternate procedure is to use benzene as the solvent and an organic base, such as triethylamine, as the acid acceptor.

With the exception of dichloro-s-triazine, the starting halo triazinyl compounds can be made by methods well known in the art, generally from cyanuric chloride, such as by the methods disclosed by Klason, J. prakt. Chem. 2, 34, 152-60 (1886), Diels et al., Ber. 36, 3191-7 (1903), and Ostrogovich, Chem. Ztg. 36, 738-9 (1912).

The following examples illustrate without limiting the invention.

EXAMPLE 1

Preparation of monoethylenemelamine

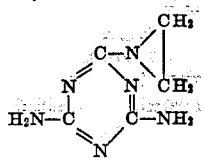

73.0 g. (0.5 mole) 2,4-diamino-6-chloro-s-triazine.
20.0 g. (0.5 mole) sodium hydroxide.
21.5 g. (0.5 mole) ethylenimine.
800 cc. water.

The above reagents are heated rapidly to 85° C. with stirring. The mixture is held at this temperature for 20 minutes, filtered hot, and the insoluble material is washed with cold water. The 62 g. of crude product so obtained is added to 1500 cc. of boiling water and dissolved by vigorous mixing for about 1-2 minutes. The solution is filtered and the filtrate is cooled rapidly. The solute crystallizes slowly at 10° C. The crystalline product weighed 25.6 g., M. P. 220-225° C.

EXAMPLE 2

Preparation of 2-ethylenimino-4,6-dimethoxy-s-triazine

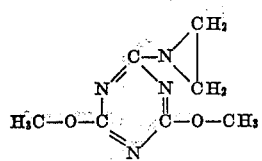

A solution of 8.6 g. (0.20 mole) of ethylenimine and 8.8 g. (0.22 mole) of sodium hydroxide in 100 cc. of water is added at 25° C. to a slurry of 35.1 g. (0.20 mole) of 2-chloro-4,6-dimethoxy-s-triazine in 200 cc. of water. The mixture is held at 25-30° C. during the addition and for 3 minutes longer. It is then warmed briefly to 55° C. The mixture is chilled and filtered yielding 25 g. (M. P. 118-122° C.). Recrystallization from 250 cc. of benzene and 50 cc. of heptane gives 7.5 g., M. P. 121-3° C.

EXAMPLE 3

Preparation of 2,4-bis(ethylenimino)-6-phenyl-s-triazine

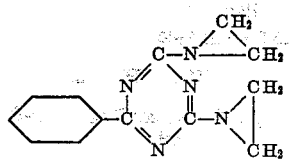

A solution of 12.9 g. (0.30 mole) of ethylenimine and 33.3 g. (0.33 mole) of triethylamine in 100 cc. of benzene was added during 35 minutes to a mixture of 33.9 g. (0.15 mole) of 2,4-dichloro-6-phenyl-s-triazine and 80 cc. of benzene while the reaction mixture was held at 15-20° C. When the addition was complete the mixture was warmed at 35° C. for one hour and then at 50° C. for thirty minutes. The benzene solution was then filtered from the insoluble triethylamine hydrochloride. By partial evaporation of the benzene solution 14.5 g. of crystalline product was obtained. This was recrystallized from 80 cc. benzene plus 50 cc. of heptane, giving 10.9 g., M. P. 142° C. (dec.).

EXAMPLE 4

*Preparation of diethyline melamine*

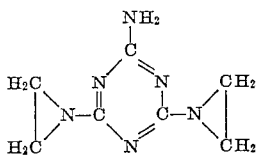

To a slurry of 165 g. (1.0 mole) of 2-amino-4,6-dichloro-s-triazine and 1 liter of water stirred at 25° C. is added a solution of 86.0 g. (2.0 moles) of ethylenimine and 88.0 g. (2.2 moles) of sodium hydroxide in 1 liter of water. The reaction mixture is stirred for one hour at 25° C. after the addition. It is then filtered, and the filter cake washed with a little water. The residue is extracted with a mixture of two liters of methanol and one liter of water. The extract is chilled, and the crystals which separate are filtered. The filtrate is used to reextract the residue from the first extraction, and a second crop of crystals is obtained. The two crops of crystals are air dried, yielding 85 g., M. P. 224° C. dec.; 48% yield.

EXAMPLE 5

*Preparation of 2-chloro-4,6-bisethylenimino-s-triazine*

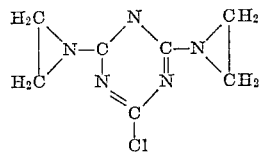

A solution of 46.1 g. (0.25 mole) of cyanuric chloride in 100 cc. of dioxane was run into 500 cc. of stirred, ice-cold water to produce a finely divided suspension of the cyanuric chloride. To this at 1±1° C. was added in 25 minutes a solution of 22.0 g. (0.51 mole) of ethylenimine and 69.1 g. (0.50 mole) of potassium carbonate in 500 cc. of water. As the addition progressed the mixture became quite thick. It was stirred 10 minutes longer at 1° C. and then was filtered. The pasty product was washed with water and dried at 60° C. in a forced draft oven. The dry product weighed 34.5 g. This crude material was extracted with a mixture of 300 cc. of carbon tetrachloride and 200 cc. of chloroform. From the solution was recovered 23.5 g., M. P. 132–135° C. dec., (47% yield of recrystallized product). Further recrystallization from benzene yielded material melting with decomposition at 135° C.

EXAMPLE 6

*Preparation of 2,4-bisethylenimino-6-methoxy-s-triazine*

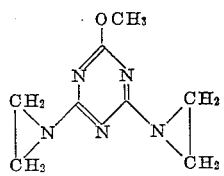

To a mixture of 36.0 g. of 2,4-dichloro-6-methoxy-s-triazine and 80 cc. of benzene, is added at 10–20° C. a solution of 17.2 g. (0.40 mole) of ethylenimine and 44.4 g. (0.44 mole) of triethylamine in 100 cc. of benzene. Reaction is strongly exothermic and the addition takes about 30 minutes. The mixture is then warmed at 35–38° C. for 90 minutes. It is filtered and the filter cake washed with a little benzene. The benzene filtrate and washings are evaporated at reduced pressure (<30° C.) to a partly crystalline residue. The crystals are filtered and washed with benzene. After air drying the product weighs 15.5 g., M. P. 110–112° C. Material recrystallized from a mixture of benzene and heptane melts at 114–116° C.

EXAMPLE 7

*Preparation of 2,4-bis(ethylenimino)-s-triazine*

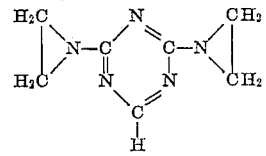

A. A 0.40 mole batch of aqueous ethylenimine was prepared by heating the following mixture at 50° C. for 80 minutes.

46.4 g. (0.400 mole) 2-chloroethylamine hydrochloride.
280 cc. water.
32.0 g. (0.40 mole) sodium hydroxide.
42.4 g. (0.40 mole) sodium carbonate.

(The reagents were mixed in the order listed.)

B. The ethylenimine solution was cooled to 3° C., and during 40 minutes a solution of 30.0 g. (.20 mole) of 2,4-dichloro-s-triazine in 100 cc. of acetonitrile was added at 3–4° C. The cooling bath was then removed and the mixture was allowed to warm naturally to 19° C. in 80 minutes. The insoluble salts (mainly sodium bicarbonate) were filtered out and washed with a little cold water and with chloroform. The combined filtrate and washings were extracted with 300 cc. of chloroform in four portions, and the chloroform solution was evaporated to dryness. The crystalline residue was taken up in approximately 100 cc. of warm benzene, the solution was filtered, and the solute was recrystallized by cooling. The crystals were washed with benzene and dried in a forced draft oven at 70° C. The dry product weighed 11.0 g. and melted at about 120° C. with decomposition. The mother liquor was concentrated and an additional 3.4 g. of lower melting material recovered. Thus the total yield of crude 2,4-bis(ethylenimino)-s-triazine was 59%.

Recrystallization of the 11.0 g. fraction from 75 cc. of benzene yielded 6.5 g., M. P. 147–8° C. dec.

The 2,4-dichloro-s-triazine used in Example 7 was made in the following way:

A mixture of 2 equivalents of cyanogen chloride and 1 equivalent of hydrogen cyanide was heated with 0.10 equivalent of hydrogen chloride as a catalyst at 60° C. for 12 hours. The thus-formed 2,4-dichloro-s-triazine is recovered by distilling off the unreacted reagents, dissolving the residue in benzene, filtering from insolubles and distilling the benzene extract. The compound distills at 100–102° C./75 mm. and solidifies. The compound melts at 52–54° C. and can be recrystallized from hexane.

While the invention has been described with particular reference to specific embodiments, it is to be understood that it is not to be limited thereto but is to be construed broadly and restricted solely by the scope of the appended claims.

We claim:
1. A compound of the formula

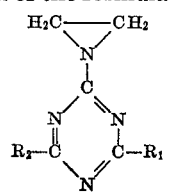

in which $R_1$ is a member of the group consisting of hydrogen, halogen, alkoxy, aromatic hydrocarbon, and amino, and $R_2$ is a member of the group consisting of $R_1$ and ethylenimino.

2. Monoethylenemelamine.
3. Diethylene melamine.
4. 2-chloro-4,6-bis(ethylenimino)-s-triazine.
5. 2,4-bis(ethylenimino)-6-methoxy-s-triazine.
6. 2,4-bis(ethylenimino)-s-triazine.

DONALD W. KAISER.
FREDERIC C. SCHAEFER.

References Cited in the file of this patent

UNITED STATES PATENTS

| Number | Name | Date |
|---|---|---|
| 2,520,619 | Wystrach et al. | Aug. 29, 1950 |